(12) United States Patent
Chang

(10) Patent No.: US 6,919,910 B2
(45) Date of Patent: Jul. 19, 2005

(54) APPARATUS AND METHOD FOR DISTRIBUTING REPRESENTATIVE IMAGES IN PARTITIONED AREAS OF A THREE-DIMENSIONAL GRAPHICAL ENVIRONMENT

(75) Inventor: Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 10/021,186

(22) Filed: Oct. 30, 2001

(65) Prior Publication Data

US 2003/0080956 A1 May 1, 2003

(51) Int. Cl.⁷ ................................. G09G 5/00
(52) U.S. Cl. ........................ 345/635; 715/517
(58) Field of Search ................ 345/635, 637; 715/506, 507, 508, 517, 518, 519, 520, 501

(56) References Cited

U.S. PATENT DOCUMENTS

| | | | | |
|---|---|---|---|---|
| 5,434,961 A | * | 7/1995 | Horiuchi et al. | 715/507 |
| 5,796,403 A | | 8/1998 | Adams et al. | |
| 5,963,956 A | * | 10/1999 | Smartt | 707/104.1 |
| 6,253,220 B1 | * | 6/2001 | Le Beux et al. | 715/530 |
| 6,545,687 B2 | * | 4/2003 | Scott et al. | 345/629 |
| 6,620,206 B1 | * | 9/2003 | Seaman et al. | 715/518 |
| 6,662,340 B2 | * | 12/2003 | Rawat et al. | 715/507 |
| 6,727,909 B1 | * | 4/2004 | Matsumura et al. | 345/629 |
| 2001/0017630 A1 | * | 8/2001 | Sakashita et al. | 345/635 |

FOREIGN PATENT DOCUMENTS

EP  0412924  2/1991

OTHER PUBLICATIONS

Johnson B. et al: "Tree–Maps: A Space–Filling Approach to the Visualization of Hierarchical Information Structures" Proceedings of the Annual Conference on Visualization San Diego, Oct. 22–25, 1991 Los Alamitos, IEEE Comp. Soc. Press US vol. Conf. 2 XP000286792.

Bruls M et al: "Squarified Treemaps" Proceedings of the Joint Eurographics and IEEE TCVG Symposium on Visualization, Data Visualization, XX, XX 2000 pp. 33–42 XP02229487.

\* cited by examiner

*Primary Examiner*—Sumati Lefkowitz
*Assistant Examiner*—Scott Wallace

(57) ABSTRACT

An apparatus and method for distributing representative images of a plurality of data objects within a database within a partitioned three-dimensional graphical environment is described. According to the apparatus and method an environment is divided into areas bounded by partitions, and groups of representative images are distributed and displayed upon these partitions. In general, distribution of the representative images is achieved by determining weight factors for each partition bounding a given area and determining weight factors for representative images that are to be displayed within the areas upon the partitions and then distributing the images dependent on the comparison of the image weight factors to partition weight factors.

20 Claims, 6 Drawing Sheets

APPARATUS AND METHOD FOR DISTRIBUTING REPRESENTATIVE IMAGES IN PARTITIONED AREAS OF A THREE-DIMENSIONAL GRAPHICAL ENVIRONMENT

FIELD OF THE INVENTION

The present invention relates to a technique for designing the layout of a three-dimensional graphical environment and in particular, this disclosure provides an apparatus and method for distributing representative images in partitioned areas of a three-dimensional graphical environment.

BACKGROUND OF THE INVENTION

Databases are often used to store information relating to large numbers of objects such as products, works of art, museum pieces, or books. Due to their size, it can be difficult to search or browse through the information stored in these databases. In many applications, it is particularly desirable to make browsing through these databases an intuitive or simple process, particularly for unsophisticated computer users or browsers. For instance, online shopping has gained popularity mainly due to its convenience. In particular, shopping can be quickly accomplished in the comfort of one's own home or office at any time, day or night. As a result, many retail stores have websites on the Internet that allow a user to select a product and purchase it online. However, if it is difficult for a typical consumer having limited computer savvy to find products on the website, the convenience of on-line shopping becomes severely diminished.

Three-dimensional graphical environments have been used to allow viewing of and navigation through information and databases (such as on a retail website) in an intuitive manner. Specifically, a three-dimensional graphical environment allows a user to intuitively navigate within a virtual space and hence easily locate and view items within the space. In order to create a three-dimensional graphical environment, it is typical to divide or partition the environment into a plurality of three-dimensional areas (e.g. rooms) and then to display representative images of related groups of objects within each area of the environment. Partitioning the environment and distributing objects within the partitioned environment in this way facilitates navigation through the environment as well as viewing of the objects of the database.

Currently, algorithms for partitioning a three-dimensional graphical environment and distributing representative images within partitioned areas of the environment are designed to accommodate a statically partitioned environment in which the items that are placed within each partitioned area does not change. As a result, the partitions and the distribution of representative images for displaying on the partitions need only be determined once and consequently the complexity of the algorithm is of little or no concern. However, in the case of a dynamically partitioned environment, in which the environment may be continually repartitioned and objects may be changed in numbers and/or regrouped and repositioned, the partition and distribution algorithms needs to have a minimal impact on the total process of rendering the three-dimensional graphical environment.

The present invention is an apparatus and method of generating a three-dimensional graphical environment for viewing a plurality of objects in a database and more particularly, is an apparatus and method of distributing representative images within areas of a partitioned environment in an aesthetically pleasing, logical, and simplified manner to further enhance browsability and navigation of the environment.

SUMMARY OF THE INVENTION

An apparatus and method for distributing representative images of a plurality of data objects in a database in a partitioned three-dimensional graphical environment is described. In particular, the environment is partitioned into a plurality of areas that are bounded by sets of partitions, and groups of representative images are distributed within the area for display upon or in close proximity to the sets of partitions.

According to the method of the present invention, each image is scaled to obtain a scaled dimension for each image while maintaining its original aspect ratio. Next, image weight factors based on scaled dimensions and partition weight factors based on an associated display dimension of each partition are determined, where the display dimension corresponds to the dimension along which the images are to be displayed. Then images are distributed to successive partitions dependent on the comparison of at least one image weight factor to each partition weight factor.

The apparatus according to the present invention includes an image dimension scaler for scaling an image while maintaining the aspect ratio of the image and a weight factor generator for determining: 1) image weight factors based on a corresponding scaled dimension of the image and 2) partition weight factors based on corresponding display dimensions of the partitions. An image distributor distributes the representative images to successive partitions of each area dependent on the comparison of at least one image weight factor to each of the partition weight factors.

DETAILED DESCRIPTION

An apparatus and method is described for distributing representative images of data objects of a database within a partitioned three-dimensional graphical environment, where the environment is divided into areas bounded by partitions and groups of representative images are distributed and displayed upon or in close proximity to these partitions. In general, distribution of the representative images is achieved by determining weight factors for partitions bounding a given area and determining weight factors for representative images that are to be displayed within the areas upon or near the partitions. Images are then distributed by comparing and matching the image weight factors to partition weight factors.

It should be noted that according to this description, a data object is broadly defined as data stored within a database that corresponds to a tangible or intangible object or element. Examples of types of data objects can include but are not limited by image data, audio data, word processing data, video data, and three-dimensional data. Examples of types of objects or elements can include but are not limited to movie videos, CDs, works of art, electronic word processing documents, electronic personnel records and commercial inventory. If, for instance, the object type is movie videos, a specific object of that type would be a particular movie.

In addition, each data object has associated data referred to as metadata which corresponds to any data other than the data object itself that describes or relates to the data object, and each data object may have different types of metadata. For instance, in the case in which the object type is movie videos, types of metadata may include data corresponding to the title, director, release date, actors, and genre (e.g., comedy, drama), etc. In contrast, in the case in which the object type is artwork, types of metadata may include title of the work and school of art (e.g., modem, impressionistic). Metadata can be stored with the data object or may be stored separately such that a link exists between the data object and its associated metadata.

According to the present invention, representative images of data objects stored within a database are displayed within a three-dimensional graphical environment to provide a user who wants to browse the database the ability to intuitively view the data objects. In accordance with the present invention, representative images can be embodied as text labels, natural images, graphical images, document and file folder images, video images, three-dimensional models, or any type of visual data related to or representative of the object.

Figure 1:
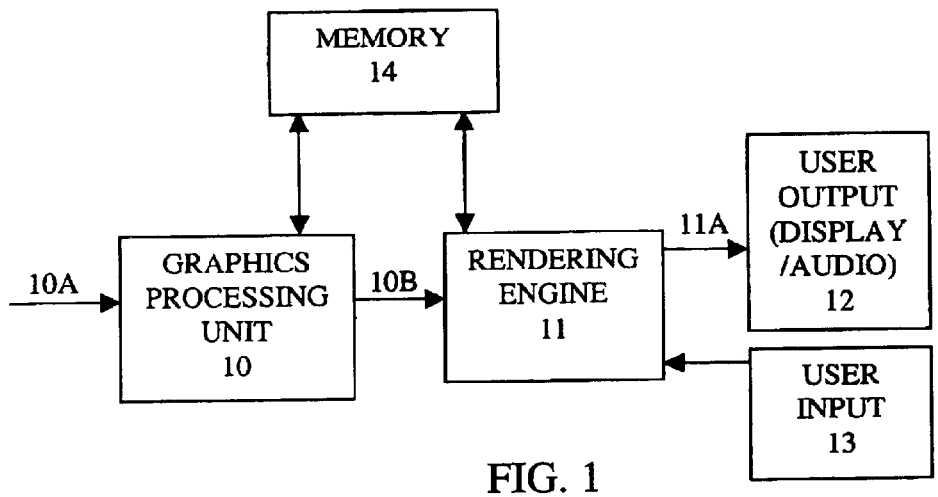
FIG. 1 illustrates a prior art system for rendering and displaying a three-dimensional graphical environment.

An example of a system for rendering and displaying a three-dimensional image is shown in FIG. 1 that includes a graphics processing unit 10, a rendering engine 11, a user output 12, a user input 13, and memory 14. The graphics processing unit 10 functions to receive data object data 10A and generate three-dimensional imaging data 10B corresponding to a three-dimensional environment including representative images of the data objects within the three-dimensional environment as is well known in the field of graphics imaging. Rendering engine 11 receives imaging data 10B and generates rendering data 11A for driving user output 12. For instance, rendering data 11A drives a monitor (not shown) to display the three-dimensional environment including the representative images. User input 13 provides an interface between a user and the three-dimensional environment so as to allow the user to interact with the three-dimensional environment. For instance, the user input 13 allows a user to change a point of view within the three-dimensional environment by moving a displayed cursor using a keyboard or mouse. Other types of user input 13 include but are not limited to a joystick and a pressure sensitive screen. Graphics processing unit 10 may function to generate the representative images of the data objects or the representative image data may be stored within the memory 14 and linked to the data object database.

Figure 2A:
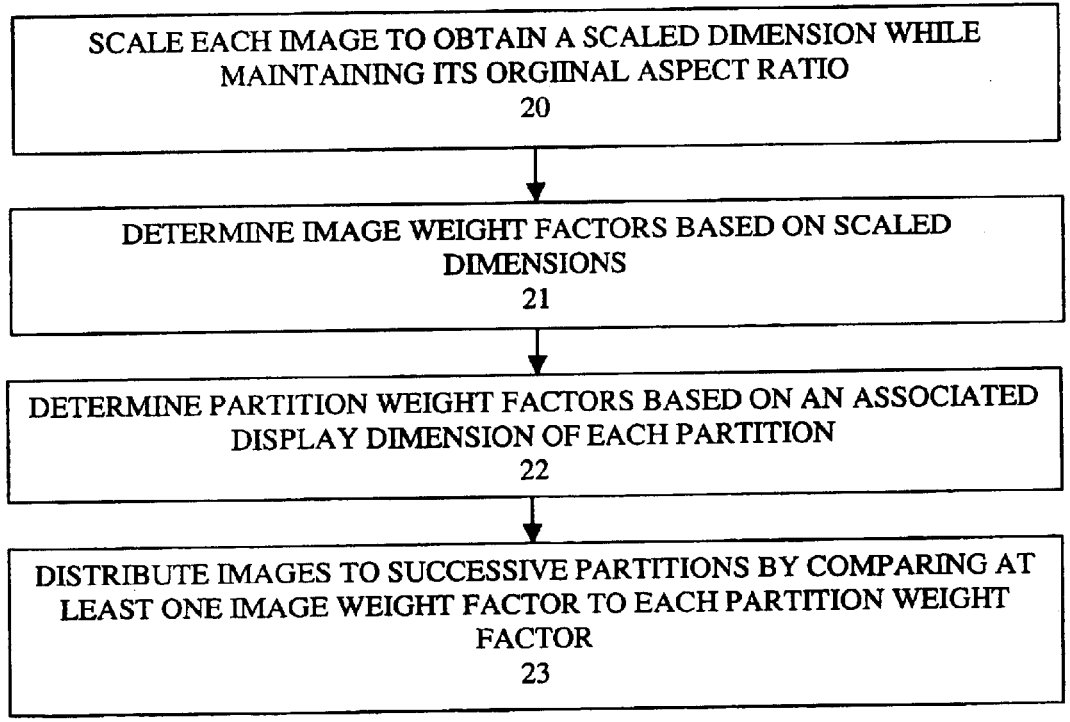
FIG. 2A illustrates a first embodiment of a method for distributing representative images within an area bounded by partitions in a three-dimensional graphical environment according to the present invention.
Figure 2B:
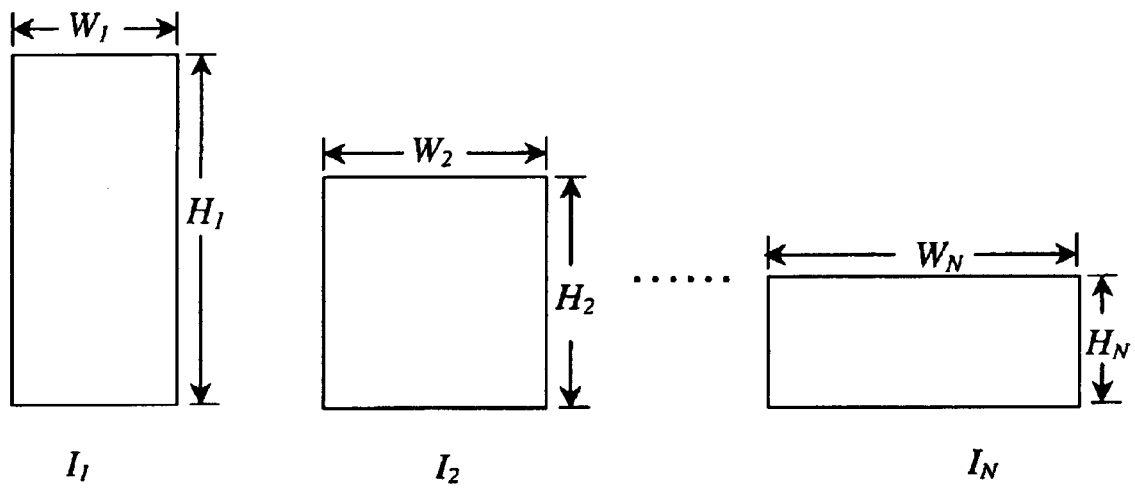
FIG. 2B illustrates an example of a plurality of images having different dimensions.
Figure 2C:
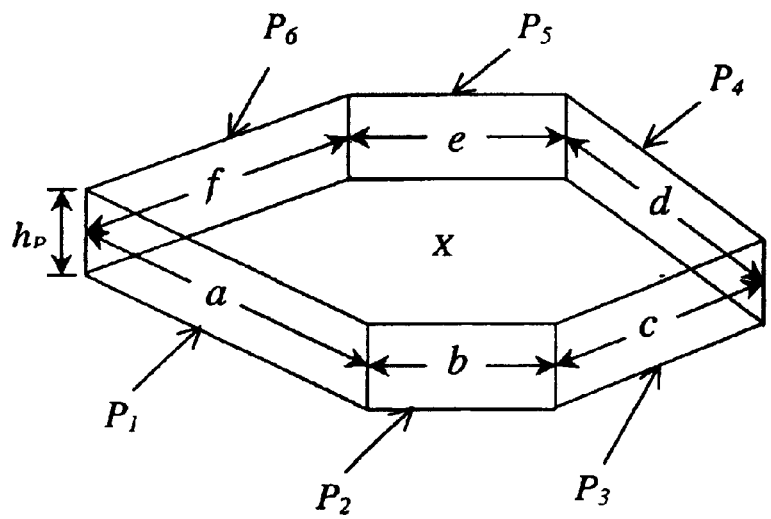
FIG. 2C illustrates an example of an area bounded by partitions.

FIG. 2A shows a first embodiment of the method of distribution of the present invention. In this method, a group of representative images are to be distributed for display within an area bounded by partitions within a three-dimensional graphical environment. FIG. 2B shows N images each having an associated height and width and FIG. 2C shows an area X within the three-dimensional graphical environment that the images are to be distributed within having partitions $P_1$–$P_6$, where the partitions have a common height of $h_P$ and have widths of a–f, respectively. Initially, a dimension of each image is scaled to obtain a scaled dimension of each image while maintaining its original aspect ratio (block 20). For example, an image dimension can be scaled by selecting a common height (or width) for all images and correspondingly scaling the width (or height) while maintaining the aspect ratio of the image. It should be noted that in the case of a three-dimensional image, the third dimension is also scaled proportionally. For example, for an image $I_l$ having a width and height of $W_l$ and $H_l$, respectively, a scaled width $\hat{W}_l$, can be determined for a selected height h using Eq. 1 below:

$$\hat{W}_l = \frac{W_l}{H_l} * h \qquad \text{Eq. 1}$$

Next, image weight factors are determined based on the scaled dimensions (block 21, FIG. 2A). Specifically, an image weight factor $W_j^I$ for each image j, where j=1, 2, . . . N is determined. In a similar manner, partition weight factors are determined based on the display dimension associated with each partition (block 22, FIG. 2A). Specifically, a partition weight factor $W_k^P$ is determined for each partition k, where k=1, 2, . . . M. According to this disclosure, the display dimension corresponds to the dimension along which the images are displayed. For instance, if images are displayed along the horizontal dimension of a partition, then the display dimension is the width of the partition. Alternatively, if images are displayed along the vertical dimension of a partition, the display dimension is the height of the partition. Finally, the images are distributed to the partitions by comparing at least one image weight factor to each partition weight factor (block 23, FIG. 2A).

Figure 3:
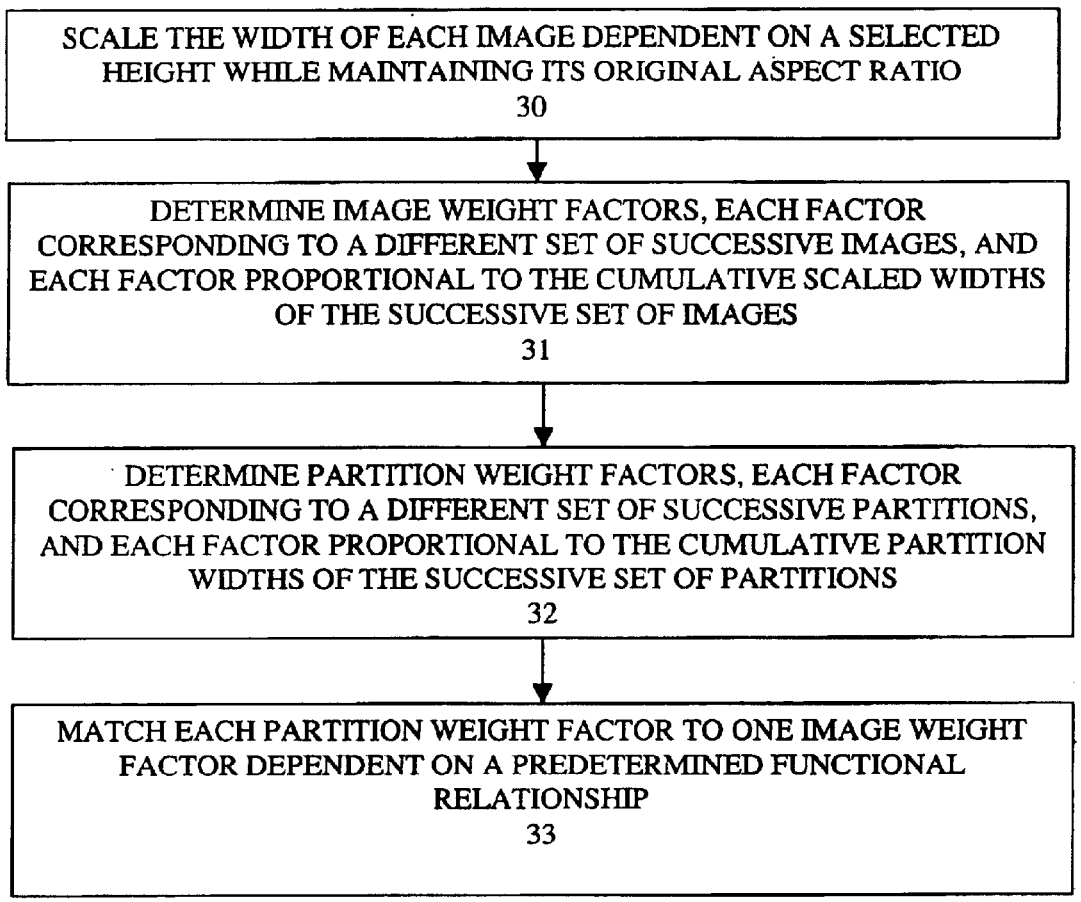
FIG. 3 illustrates a second embodiment of a method for distributing representative images within an area bounded by partitions in a three-dimensional graphical environment according to the present invention.

FIG. 3 shows a second embodiment of a method of distributing images according to the present invention in which images are initially scaled to obtain a scaled width while maintaining its original aspect ratio (block 30). In one embodiment, all of the image heights are set to a selected height h that is less than the common height of the partitions $h_P$ that the images are to be distributed and displayed upon or near, and each image width is scaled to obtain a scaled width dimension $\hat{W}_l$, while maintaining the aspect ratio of each image $I_l$ according to Eq. 1.

Next, image weight factors are determined where each factor corresponds to a different set of successive images, and each factor is proportional to the cumulative scaled widths of the successive set of images (block 31). The image weight factor $W_j^I$ for the cumulative set of the first j images, where j=1, 2, . . . N and the set of images includes images $I_1$ to $I_j$, is determined as shown in Eq. 2:

$$W_j^I = \frac{\sum_{i=1}^{j} \hat{W}_i}{\hat{W}_1 + \hat{W}_2 + \hat{W}_3 + \ldots \hat{W}_N} \qquad \text{Eq. 2}$$

Table 1 shows examples of image weight factors for successive sets of images:

TABLE 1

| Set of Images | Image Weight Factor |
|---|---|
| $I_1$ | $W_1^I = \dfrac{\hat{W}_1}{\hat{W}_1 + \hat{W}_2 + \hat{W}_3 \ldots + \hat{W}_N}$ |
| $I_1, I_2$ | $W_2^I = \dfrac{\hat{W}_1 + \hat{W}_2}{\hat{W}_1 + \hat{W}_2 + \hat{W}_3 \ldots + \hat{W}_N}$ |
| $I_1, I_2, I_3$ | $W_3^I = \dfrac{\hat{W}_1 + \hat{W}_2 + \hat{W}_3}{\hat{W}_1 + \hat{W}_2 + \hat{W}_3 \ldots + \hat{W}_N}$ |
| $I_1, I_2, I_3 \ldots I_N$ | $W_N^I = \dfrac{\hat{W}_1 + \hat{W}_2 + \hat{W}_3 \ldots + \hat{W}_N}{\hat{W}_1 + \hat{W}_2 + \hat{W}_3 \ldots + \hat{W}_N} = 1.0$ |

Similarly, partition weight factors are determined such that each corresponds to a different set of successive partitions, and each factor is proportional to a cumulative partition width of the successive partitions (block 32). Partition weight factors $W_k^P$ are determined for successive sets of partitions according to Eq. 3:

$$W_k^P = \frac{\sum_{i=1}^{k} w_i}{w_1 + w_2 + w_3 \ldots + w_M} \qquad \text{Eq. 3}$$

for k successive sets of partitions, where k=1, 2, ... M, where partition i has a weight $w_i$, and where each set of partitions includes partition $P_1$ to $P_k$. In the case of the partitioned area shown in FIG. 2C having partitions $P_1$–$P_6$ with widths a–f, respectively, the partition weight factors are as follows in Table 2:

TABLE 2

| Set of Partitions | Partition Weight Factor |
|---|---|
| $P_1$ | $W_1^P = \dfrac{a}{a+b+c+d+e+f}$ |
| $P_1, P_2$ | $W_2^P = \dfrac{a+b}{a+b+c+d+e+f}$ |
| $P_1, P_2, P_3$ | $W_3^P = \dfrac{a+b+c}{a+b+c+d+e+f}$ |
| $P_1, P_2, P_3, P_4$ | $W_4^P = \dfrac{a+b+c+d}{a+b+c+d+e+f}$ |
| $P_1, P_2, P_3, P_4, P_5$ | $W_5^P = \dfrac{a+b+c+d+e}{a+b+c+d+e+f}$ |
| $P_1, P_2, P_3, P_4, P_5, P_6$ | $W_6^P = \dfrac{a+b+c+d+e+f}{a+b+c+d+e+f} = 1.0$ |

As described above, the image and partition weight factors are all non-negative numbers and are non-decreasing with index, i.e. $W_1^I \leq W_2^I \leq \ldots W_N^I$ and $W_1^P \leq W_2^P \leq \ldots W_M^P$.

The image and partition weight factors are compared and more particularly, each partition weight factor is matched to one image weight factor dependent on a predetermined functional relationship (block 33) wherein images are distributed dependent on the matching weight factors. Based on the functional relationship, the matching of weight factors can effectively create a balanced distribution of image weight (and consequently images) within the partition area dependent on the partition weight distribution within the area. As an example, initially a first partition weight factor, $W_1^P$ as shown in Eq. 4:

$$W_1^P = \frac{a}{a+b+c+d+e+f} \qquad \text{Eq. 4}$$

is compared to at least one image weight factor. In other words, at least one of $W_1^I, W_2^I, \ldots, W_N^I$ is compared to $W_1^P$ and then dependent on this comparison, the images are distributed to this partition. Similarly, $W_2^P$ is compared to at least one of image weight factors $W_1^I, W_2^I, \ldots, W_N^I$ and then dependent on this comparison and on previously distributed images, the images are distributed to this partition.

In one embodiment, the functional relationship is the smallest absolute difference between one of the image weight factors and each partition weight factor. In other words, in comparing each partition weight factor $W_i^P$ to at least one image weight factor, the image weight factor $W_k^I$ that satisfies the desired functional relationship corresponds to the image weight factor that minimizes $|W_k^I - W_i^P|$ for each partition. For instance, comparing the first partition weight factor $W_1^P$ to successive image weight factors $W_1^I$, $W_2^I, \ldots, W_N^I$, suppose the following relationships are observed: $|W_1^I - W_1^P| > |W_3^I - W_1^P|$, $|W_2^I - W_1^P| > |W_3^I - W_1^P|$, and $|W_4^I - W_1^P| > |W_3^I - W_1^P|$. Since image weight factors are cumulative, any image weight factors having indexes greater than k=4 would also result in an absolute difference greater than $|W_3^I - W_1^P|$. Consequently, image weight factor $W_3^I$ is matched to partition weight factor $W_1^P$ and the images corresponding to image weight factor $W_3^I$ (i.e. images $I_1$, $I_2$, and $I_3$) are distributed onto the partition corresponding to partition weight factor $W_1^P$. The images are distributed in a similar manner for the remaining partitions. Note that in the above example, if the second partition weight factor $W_2^P$ also matches with the third image weight factor $W_3^I$, then no images would be distributed on the second partition.

In another embodiment, the functional relationship is the greatest image weight factor that is less than the partition weight factor. Hence according to the method shown in FIG. 3, block 33 is performed such that the image and partition weight factors are compared and matched to the greatest image weight factor that is less than the partition weight factor wherein images are distributed dependent on the matching of weight factors. For instance, comparing partition weight factor $W_1^P$ with image weight factors $W_1^I$, $W_2^I, \ldots, W_N^I$, suppose the following relationships are observed: $W_1^I < W_1^P$, $W_2^I < W_1^P$, and $W_3^I > W_1^P$. Hence, the greatest image weight factor that is less than $W_1^P$ is $W_2^I$, and thus $W_1^P$ is matched to $W_2^I$. As a result, images $I_1$ and $I_2$ are distributed to partition $P_1$ since their combined weight is less than the weight of partition $P_1$. To consider the next partition, partition $P_2$, the cumulative partition weight factor $W_2^P$ is compared and matched to at least one of image weight factors $W_1^I, W_2^I, \ldots, W_N^I$, however, since images $I_1$ and $I_2$ have already been assigned, $W_2^P$ is compared to image weight factors corresponding to images that have yet to be assigned, i.e., $W_3^I, W_4^I, \ldots, W_N^I$. In this case, the following relationships are observed: $W_3^I<W_2^P$, $W_4^I<W_2^P$, $W_5^I<W_2^P$, and $W_6^I>W_2^P$. Hence, the greatest image weight factor that is less than $W_2^P$ is $W_5^I$. Consequently, images $I_3$, $I_4$, and $I_5$ are assigned to partition $P_2$.

It should be noted that the indexing and ordering of the images and partitions are not necessarily fixed and can be varied in order to obtain the best distribution of images to the partitions.

Figure 4:
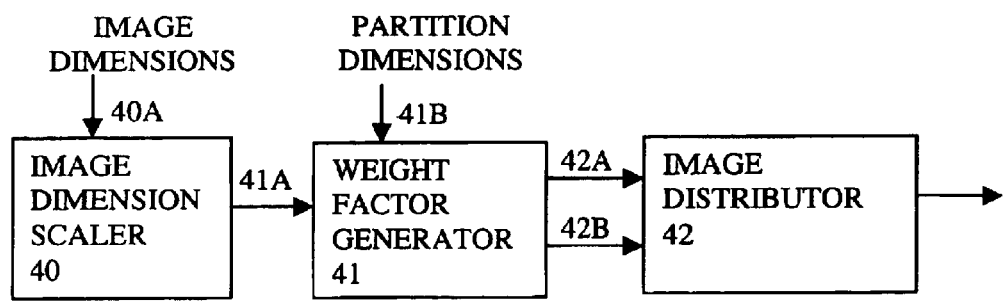
FIG. 4 illustrates an embodiment of an apparatus for distributing representative images within an area bounded by partitions in a three-dimensional graphical environment according to the present invention.

FIG. 4 illustrates an embodiment of an apparatus for distributing representative images to partitions bounding an area in a three-dimensional graphical environment which includes an image dimension scaler 40, a weight factor generator 41, and an image distributor 42. The image dimension scaler 40 receives image dimensions 40A and generates newly scaled dimensions 41A. The weight factor generator 41 generates image weight factors 42A in response to the scaled dimensions 41A and generates partition weight factors 42B in response to the partition dimensions 41B. Image distributor 42 compares image and partition weight factors and distributes images dependent on the comparison of the image and partition weight factors. It should be understood that the apparatus shown in FIG. 4 can be implemented in any combination of hardware, software, or firmware.

In another embodiment of the method of the present invention, a three-dimensional graphical environment is initially partitioned into areas dependent on data object metadata as described in co-pending application Ser. No. 10/021,223 entitled "Layout Design Apparatus and Method for Three-Dimensional Graphical Environments" (filed Oct. 30, 2001, assigned to the assignee of the subject application, and then images grouped dependent on the metadata are distributed into each corresponding area according to the methods as shown in FIG. 2A or 3.

Figure 5A:
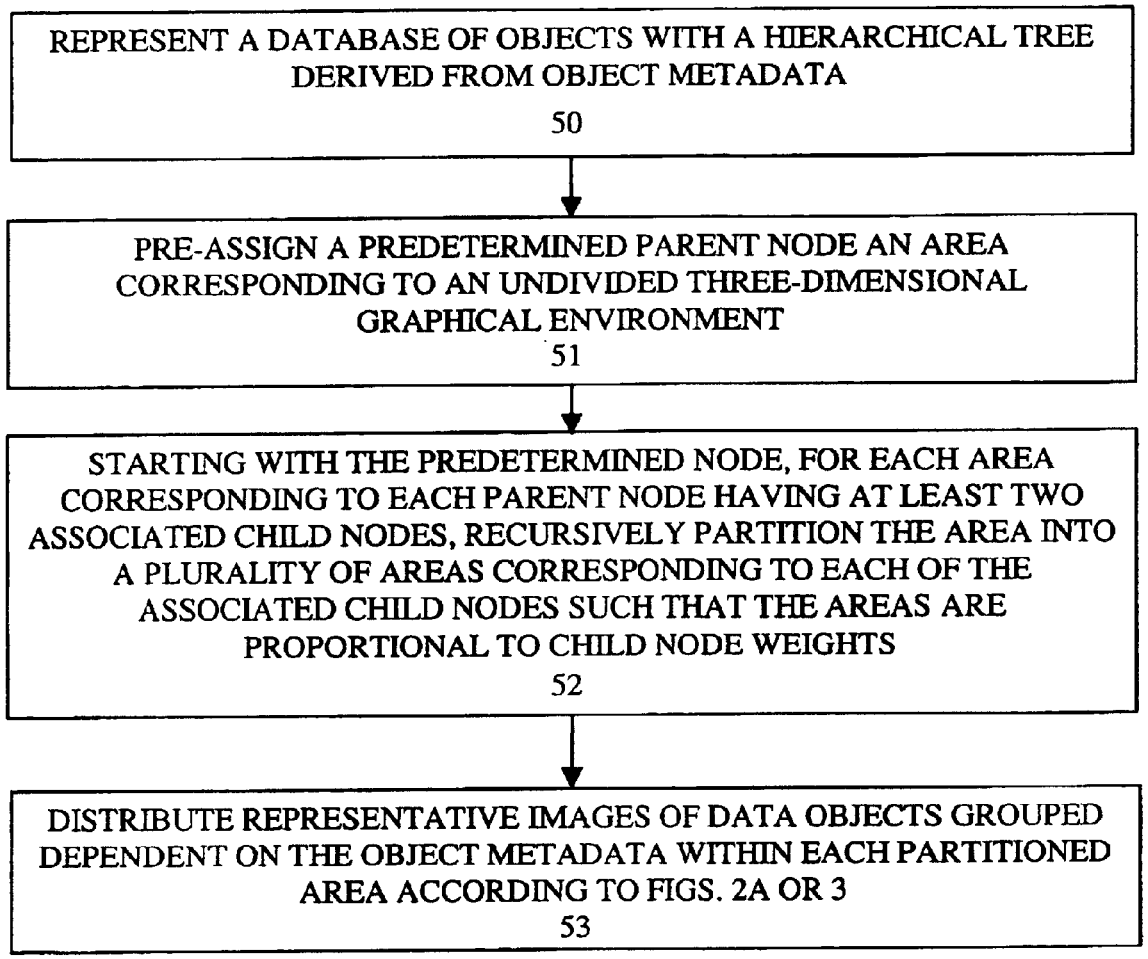
FIG. 5A illustrates an embodiment of the present invention in which a three-dimensional graphical environment is partitioned and the images are distributed within the environment.

FIG. 5A shows one embodiment of a method of partitioning a three-dimensional graphical environment and distributing images into areas of the partitioned three dimensional environment, where the three-dimensional graphical environment is partitioned by representing the database of objects as a hierarchical tree derived from object metadata (block 50). A predetermined node is pre-assigned an area corresponding to an undivided three-dimensional graphical environment (block 51). Then, starting at the predetermined node, for each area corresponding to each parent node having at least two associated child nodes in the tree, the area is recursively partitioned into a plurality of areas corresponding to each of the associated child nodes such that the areas are proportional to the child nodes' weights (block 52).

Figure 5B:
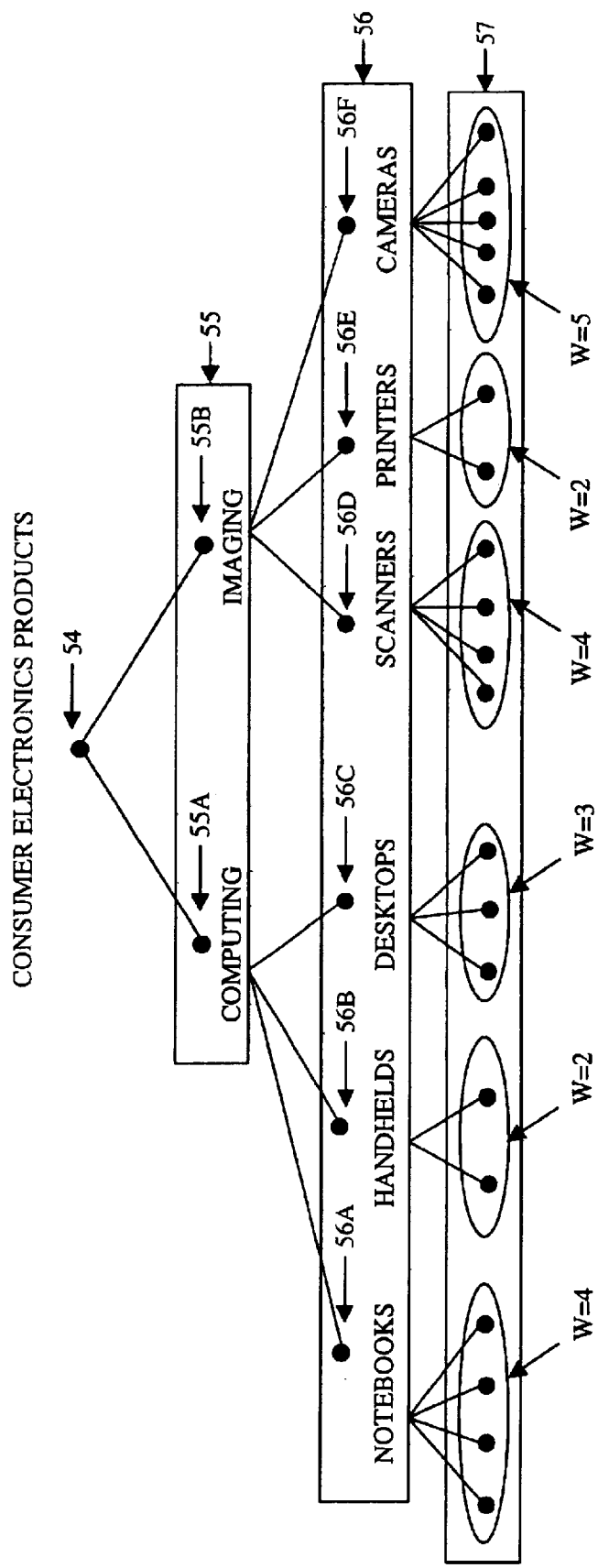
FIG. 5B illustrates a database of objects represented by a hierarchical tree.

FIG. 5B shows an example of a database represented by a hierarchical tree. The tree includes a plurality of nodes 54, 55A, 55B, 56A–56C, 56D–56F, and 57. The tree nodes can be classified as a parent node or child node dependent on their relationship to other nodes in the tree. For instance, node 54 is the parent node to child nodes 55A and 55B, node 55A is the parent node to child nodes 56A–56C, node 55B is the parent node to child nodes 56D–56F. Nodes 57 are data object nodes each corresponding to one of the data objects within the database. Hence, each of the nodes 56A–56F is the parent node of a corresponding group of data object child nodes.

In addition, each of the nodes 54–56 corresponds to different metadata types used for classifying the data object nodes 57. For instance, nodes 55 correspond to product function type that includes computing type products and imaging type products. Under the computing type product node are a first set of device type nodes including notebooks, handhelds, and desktops. Under the imaging type product node are a second set of device type nodes including scanners, printers, and cameras. Under each of the device type nodes are the actual products each corresponding to a data object within the database.

Each node in the tree has a weight determined by the weighting of data objects associated with it. The weight of a given node is determined by traversing downward along all continuous paths within the tree to the data object nodes to determine the combined weighting of the data objects associated with the given node along the continuous path. For instance, in this example, assuming each data object node has a weighting of one, node 56A has a weight W=4, node 56B has a weight W=2, node 56C has a weight W=3, node 56D has a weight W=4, node 56E has a weight W=2, node 56F has a weight W=5. Hence, by traversing from each of nodes 55A and 55B to data object nodes 57 along all continuous paths within the tree, node 55A has a weight W=9 and node 55B has a weight W=11. It should be noted that nodes can be weighted in a variety of manners according to user preference, system default settings, or other node weighting methodologies. For instance, the object nodes may have a weight greater than one or some non-object nodes (e.g., 54–56) may have an additional associated weighting factor that is not dependent on the weight of the data objects associated with them. As a result, node weight determination may be dependent on the manner in which the nodes of the tree are initially weighted in addition to the data object weight associated with it. In other cases, the weight of the nodes may be indirectly related to the data object weight associated with it.

Figure 5C:
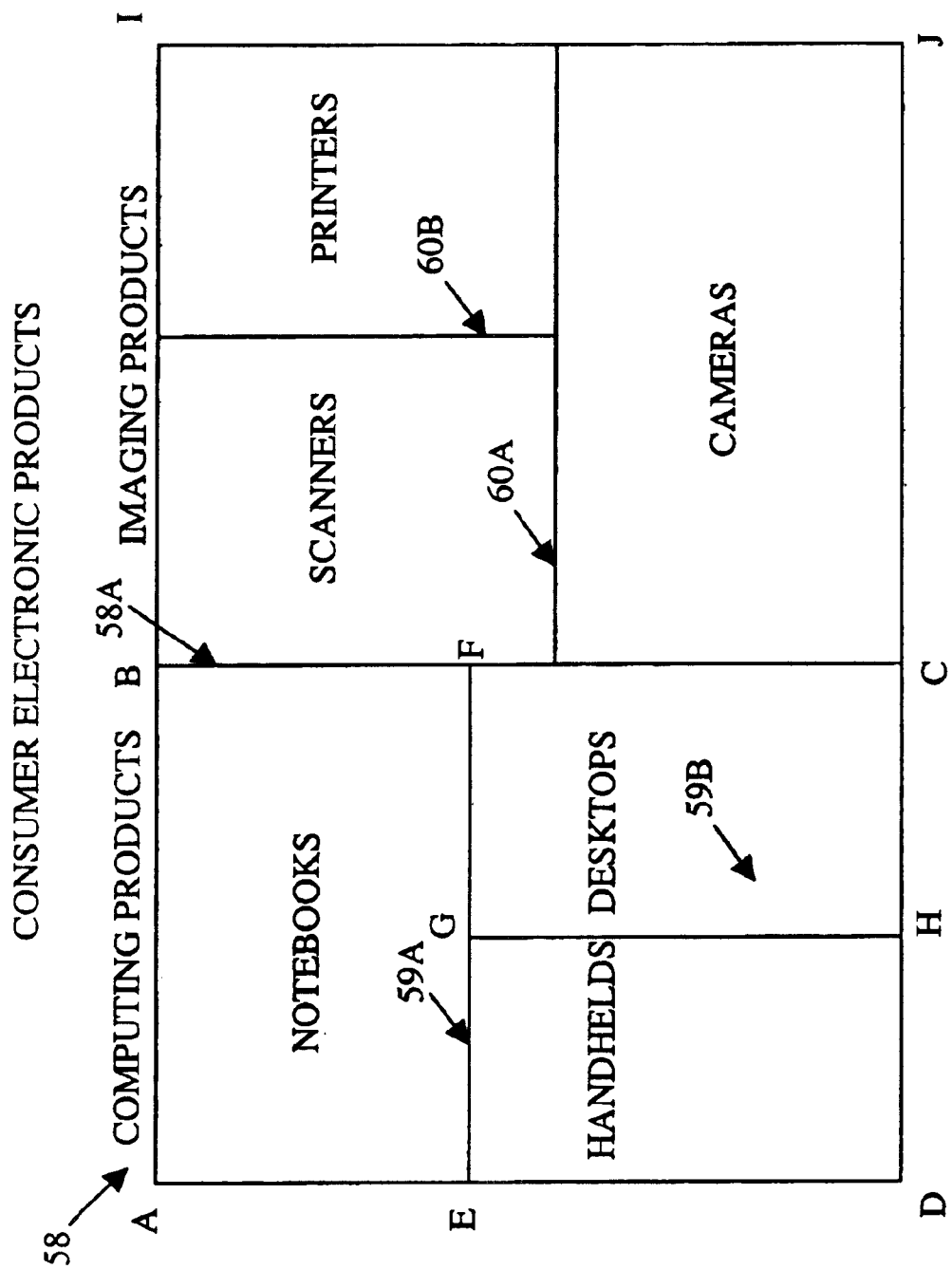
FIG. 5C illustrates a three-dimensional graphical area partitioned according to the method shown in FIG. 5A.

FIG. 5C shows an example of a two-dimensional area corresponding to the layout of a three-dimensional graphical environment partitioned according the method of the present invention using the hierarchical tree shown in FIG. 5B. In this example, the database of objects is represented by a hierarchical tree derived from object metadata by grouping objects according to three metadata types: electronic products, their function, and device type. Next, the topmost node of the tree, node 54, is pre-assigned to an undivided three-dimensional graphical environment. In this example, the three-dimensional environment corresponds to the two-dimensional area 58 bounded by vertices AUD (FIG. 5C). Node 54 is a parent node having at least two child nodes including nodes 55A and 55B. Each of child nodes 55A and 55B have a weight of W=9 and W=11, respectively. Then, starting with node 54, area 58 is divided by partition 58A to form two areas each proportional to the weights of nodes 55A and 55B: one corresponding to computing products and the other corresponding to imaging products. More particularly, the area corresponding to computing products is 9/20 of the total area 58 and the area corresponding to imaging products is 11/20 of the total area 58. Similarly, the computing products area (FIG. 5C) associated with the next parent node in the tree, node 55A, is proportionally divided by partitions 59A and 59B dependent on the weights of nodes 56A–56C and the imaging products area (FIG. 5C) associated with the last parent node, 55B, is proportionally divided by partitions 60A and 60B dependent on the weights of nodes 56D–56F.

Once the three-dimensional graphical environment is partitioned according to blocks 50–52 (FIG. 5A), grouped representative images are distributed within the areas dependent on the metadata and according to the methods shown in FIG. 2A or 3 (block 53). For instance, in the case of FIGS.

5B and 5C, data object nodes 57 are grouped dependent on the metadata grouping of the tree. The representative images of the metadata-related grouped nodes are associated with a particular area within the environment dependent on the partitioning of the environment. For instance, as shown in FIG. 5C the four child object nodes of parent node 56A (corresponding to notebook products) are associated to the area bounded by vertices ABFE (FIG. 5C). Hence, the representative images of the data objects associated with the notebook product data object nodes are distributed within the area according to the methods shown in FIG. 2A or 3.

It should be understood that although the partitions are shown to be contiguous in FIG. 2B, there may be gaps between partitions bounding an area, for instance, representing doorways into other areas. Moreover, it should be noted that areas need not be rectangular in shape. Additionally, although examples of the methods and apparatus as described distribute a single horizontal row or vertical column of images per each partition, it should be understood that multiple lines of images (not necessarily horizontal or vertical) can be distributed per partition. In this case, images can be distributed according to matched image and partition weight factors as described above and then images assigned to each partition can be distributed to their corresponding sub-partitions.

It should also be understood that partitions need not be arranged in the manner as shown in FIG. 2B in order to bound area X. For instance, partitions may be stacked on top of one another, stacked in a skewed fashion, or may not be directly connected and contiguous.

It should be further understood that according to the methods described in FIGS. 2A, 3, and 5A images are scaled to determine scaled dimensions. However, not all images need be scaled with respect to a single common dimension or even scaled at all. For instance, an image having a dimension less than or equal to the common dimension that all of the other images are scaled to need not be scaled.

According to this embodiment, since objects are grouped according to metadata and the area is partitioned dependent on the metadata grouping of the objects, the size of the area bounded by the partitions is automatically set to a size to accommodate the number of objects to be distributed within it (assuming that the size of the entire environment is selected to accommodate all of the objects to be distributed within it). This ensures that when distributing the representative images according to block 53 (FIG. 5A) that the display dimension of the partitions is large enough to accommodate the group of images to be displayed within it.

In the preceding description, numerous specific details are set forth in order to provide a thorough understanding of the present invention. It will be apparent, however, to one skilled in the art that these specific details need not be employed to practice the present invention. In other instances, well-known techniques have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method for distributing representative images of a group of objects in a database for display within an area bounded by a plurality of partitions within a three-dimensional graphical environment comprising:
    scaling an image to obtain a scaled dimension for each image while maintaining its original aspect ratio;
    determining image weight factors based on scaled dimensions;
    determining partition weight factors based on an associated display dimension of each partition;
    distributing images to successive partitions by matching each partition weight factor to one image weight factor dependent on a predetermined functional relationship.

2. The method as described in claim 1 wherein the scaled dimension is image width and the associated display dimension is partition width.

3. The method as described in claim 1 wherein the functional relationship is the greatest image weight factor that is less than each partition weight factor.

4. The method as described in claim 1 wherein the functional relationship is the image weight factor that minimizes the absolute difference between the image weight factor and each partition weight factor.

5. The method as described in claim 1 wherein the partitions are not necessarily contiguous.

6. The method as described in claim 1 wherein images are scaled by setting all heights of images to a common height where the common height is less than or equal to a common height of the partitions.

7. An apparatus for distributing representative images of a group of objects in a database for display within an area defined by a plurality of partitions within a three-dimensional graphical environment comprising:
    image dimension scaler for scaling each image to obtain a scaled dimension while maintaining the aspect ratio of the image;
    weight factor determiner for determining image weight factors based on corresponding scaled dimensions and for determining partition weight factors based on corresponding display dimensions; and
    image distributor for distributing images to successive partitions dependent on the matching of each partition weight factor to one image weight factor dependent on a predetermined functional relationship.

8. The apparatus as described in claim 7 wherein the scaled dimension is image width and the associated display dimension is partition width.

9. The apparatus as described in claim 7 wherein the predetermined functional relationship is the greatest image weight factor that is less than each partition weight factor.

10. The apparatus as described in claim 7 wherein the predetermined functional relationship is the image weight factor that minimizes the absolute difference between the image weight factor and each partition weight factor.

11. The apparatus as described in claim 7 wherein the partitions are not necessarily contiguous.

12. The apparatus as described in claim 7 wherein images are scaled by setting all heights of images to a common height where the common height is less than or equal to a common height of the partitions.

13. A method of displaying representative images of a plurality of data objects in a database within a three-dimensional graphical environment comprising:
    partitioning the environment by representing a database of objects with a hierarchical tree including object nodes derived from object metadata and recursively partitioning the environment into a plurality of areas bounded by partitions such that the areas are proportional to object node weights;

distributing groups of representative images within each of the plurality of areas by:
scaling images to obtain a scaled dimension for each image in the group while maintaining its original aspect ratio;
determining image weight factors for the group of images based on scaled dimensions;
determining partition weight factors based on an associated display dimension of each partition;
distributing the group of images to successive partitions by matching each partition weight factor to one image weight factor dependent on a predetermined functional relationship.

14. The method as described in claim 13 wherein representative images are grouped according to the hierarchical tree.

15. The method as described in claim 13 further comprising grouping images dependent on the object metadata.

16. The method as described in claim 13 wherein the scaled dimension is image width and the associated display dimension is partition width.

17. The method as described in claim 13 wherein the functional relationship is the greatest image weight factor that is less than each partition weight factor.

18. The method as described in claim 13 wherein the functional relationship is the image weight factor that minimizes the absolute difference between the image weight factor and each partition weight factor.

19. The method as described in claim 13 wherein the partitions are not necessarily contiguous.

20. The method as described in claim 13 wherein images are scaled by setting all heights of images to a common height where the common height is less than or equal to a common height of the partitions.

* * * * *

UNITED STATES PATENT AND TRADEMARK OFFICE
CERTIFICATE OF CORRECTION

| | | |
|---|---|---|
| PATENT NO. | : 6,919,910 B2 | Page 1 of 1 |
| APPLICATION NO. | : 10/021186 | |
| DATED | : July 19, 2005 | |
| INVENTOR(S) | : Nelson Liang An Chang | |

It is certified that error appears in the above-identified patent and that said Letters Patent is hereby corrected as shown below:

In column 8, line 45, delete "AUD" and insert -- AIJD --, therefor.

Signed and Sealed this

Twenty-fifth Day of August, 2009

David J. Kappos
*Director of the United States Patent and Trademark Office*